(12) United States Patent
Chavez, Jr.

(10) Patent No.: US 6,195,560 B1
(45) Date of Patent: Feb. 27, 2001

(54) DYNAMIC ASSOCIATIVE GROUP PICKUP

(75) Inventor: David L. Chavez, Jr., Thornton, CO (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/162,495

(22) Filed: Sep. 29, 1998

(51) Int. Cl.[7] .......................................... H01S 4/00
(52) U.S. Cl. ............................ 455/518; 455/519; 455/403
(58) Field of Search ................................... 455/518, 519, 455/422, 432, 435, 436, 456, 403, 517, 567

(56) References Cited

U.S. PATENT DOCUMENTS 5,924,041 * 7/1999 Alperovich et al. ................. 455/433

FOREIGN PATENT DOCUMENTS

| 39 32 029 A1 | 9/1989 | (DE) | G01S/1/00 |
| 2 223 869 | 9/1988 | (GB) | G08B/25/00 |

* cited by examiner

Primary Examiner—Huyen Le
Assistant Examiner—Melur Ramakrishnaiah
(74) Attorney, Agent, or Firm—John C. Moran

(57) ABSTRACT

A wireless terminal is dynamically placed into a call pickup group based on the location of the wireless telephone. Similarly, a wireless terminal is dynamically removed from a call pickup group on the basis of the location of the wireless terminal. A wireless terminal can be excluded from joining a call pickup group in a specific location.

11 Claims, 10 Drawing Sheets

| WIRELESS TERMINAL $_{201}$ | PICKUP GROUP LOCATION $_{202}$ | EXCLUDED LOCATIONS $_{203}$ | FIXED UNIT $_{204}$ |
|---|---|---|---|
| 102 |  | 114 | 117 |
| 103 |  | 113  114 | 117 |
| 104 | 113 |  | 115 |
| 105 | 113 |  | 115 |
| 106 | 113 |  | 115 |
| 107 | 114 |  | 116 |
| 108 | 114 |  | 116 |
| 109 | 114 |  | 116 |

TABLE 1

*FIG. 2*

| WIRELESS TERMINAL $_{201}$ | PICKUP GROUP LOCATION $_{202}$ | EXCLUDED LOCATIONS $_{203}$ | FIXED UNIT $_{204}$ |
|---|---|---|---|
| 102 | 113 | 114 | 115 |
| 103 |  | 113  114 | 115 |
| 104 | 113 |  | 115 |
| 105 | 113 |  | 115 |
| 106 | 113 |  | 115 |
| 107 | 114 |  | 116 |
| 108 | 114 |  | 116 |
| 109 | 114 |  | 116 |

TABLE 1

*FIG. 3*

| WIRELESS TERMINAL (201) | PICKUP GROUP LOCATION (202) | EXCLUDED LOCATIONS (203) | FIXED UNIT (204) |
|---|---|---|---|
| 102 | 113 | 114 | 115 |
| 103 |  | 113  114 | 117 |
| 104 | 113 |  | 115 |
| 105 | 113 |  | 115 |
| 106 | 113 |  | 115 |
| 107 | 113 |  | 115 |
| 108 | 114 |  | 116 |
| 109 | 114 |  | 116 |

TABLE 1

*FIG. 4*

| AREA TELEPHONE NUMBER | CUBICLE AREA |
|---|---|
| 538-2902 | 112 |
| 538-2903 | 113 |
| 538-2904 | 114 |

TABLE 2

DYNAMIC ASSOCIATIVE GROUP PICKUP

TECHNICAL FIELD

This invention relates generally to wireless switching systems and, in particular, to telephone call management within such a system.

BACKGROUND OF THE INVENTION

When a number of telephones are situated in a common open area, a situation often arises where the user of one of the ringing telephones does not answer. It is highly desirable for another individual within the area to utilize their own telephone to answer the incoming call for the other telephone. Within the prior art this has been accomplished by placing the telephones within the common area into a call pickup group. If a first telephone within the call pickup group is being rung, a user of a second telephone of the call pickup group can actuate a designated button on their telephone or dial a special code to answer the call that is directed to the first telephone.

The prior art pickup groups have functioned well with wired telephone sets. Such pickup groups are manually administered on the telecommunication switching system providing service for the telephones within the pickup group. In particular, the prior art pickup groups and their administration have functioned well for the traditional business environment where an employee is assigned a desk or a specific location and performs their principle work function at that telephone or location. The traditional environment is slowly changing. In the emerging business environment, individuals do not have a wired telephone but rather they have a wireless telephone that they carry with them at all times and that is their only telephone. In addition, employees during the course of a day perform many functions at different locations.

SUMMARY OF THE INVENTION

The foregoing problems are solved, and a technical advance is achieved by an apparatus and method in which a wireless terminal is dynamically placed into a call pickup group based on the location of the wireless telephone. Similarly, a wireless terminal is dynamically removed from a call pickup group on the basis of the location of the wireless terminal. Advantageously, a wireless terminal can be excluded from joining a call pickup group in a specific location.

Other and further aspects of the present invention will become apparent during the course of the following description and by reference to the accompanying drawing.

BRIEF DESCRIPTION OF THE DRAWING

FIGS. 2, 3, and 4 illustrate Table 1 that is maintained by a wireless switching system in implementing the invention;

DETAILED DESCRIPTION

Figure 1:
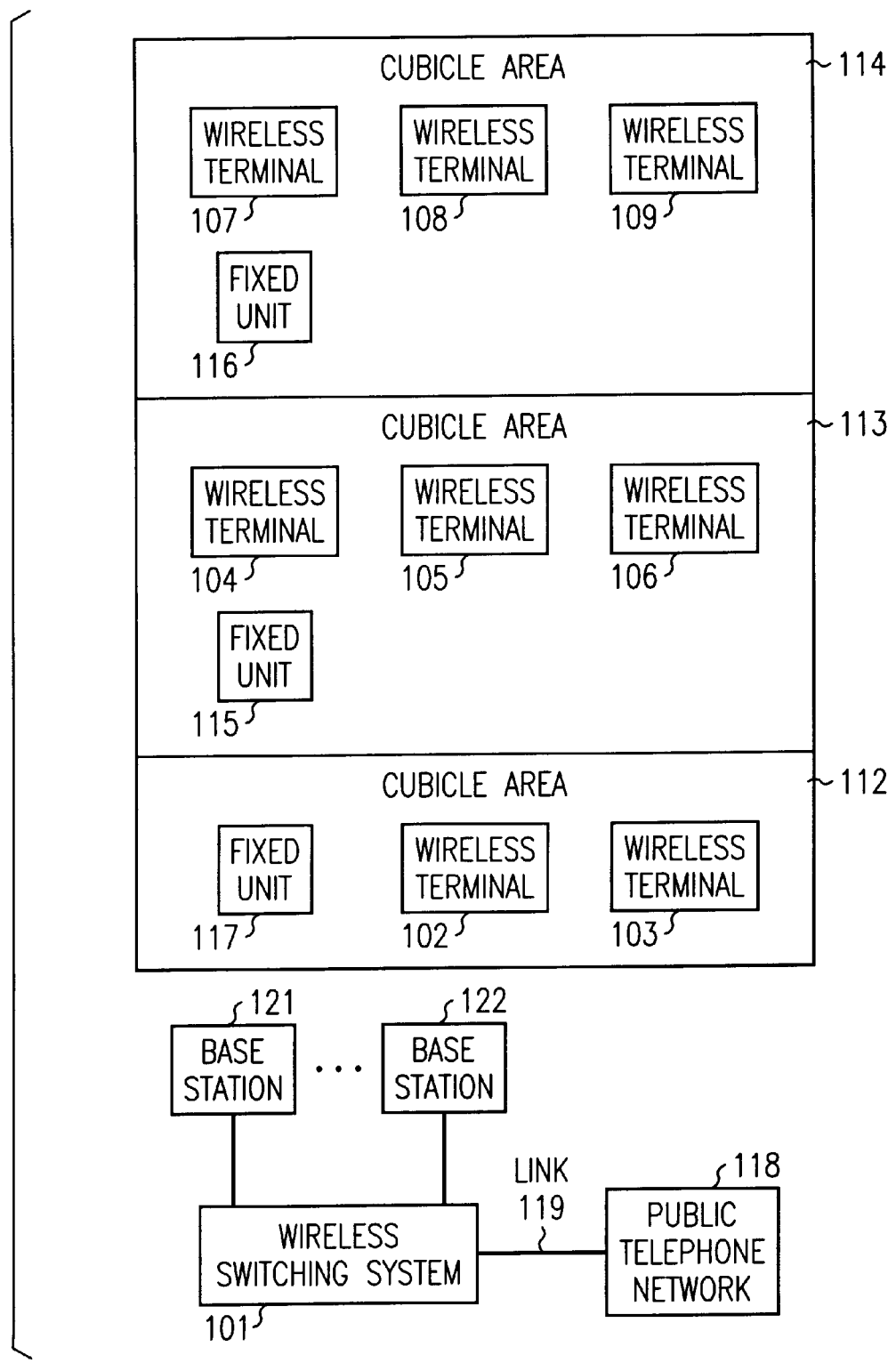
FIG. 1 is a block diagram of a wireless system for implementing the invention.

FIG. 1 illustrates, in block diagram form, a wireless system for implementing the invention. Wireless switching system 101 via base stations 121–122 provides wireless service for wireless terminals 102–109 that are free to roam throughout cubicle areas 112–114. Wireless switching system 101 constantly determines the location of each wireless terminal. This determination is performed in the following manner. Each fixed unit transmits at predefined intervals the identification of the fixed unit via a different transmission medium than utilized by the base stations 121–122. This transmission medium may be an infrared transmission. Wireless terminals 102–109 have a receiver for receiving the infrared transmission from the fixed units. When a wireless terminal receives the identification code from a fixed unit, the wireless terminal establishes a data channel to wireless switching system 101 and transmits the identification of the fixed unit via this data channel. Wireless switching system 101 then records in Table 1 as illustrated in FIGS. 2, 3, and 4 the identity of the fixed unit from which the wireless terminal is receiving an identification code. This information is placed into column 204 of Table 1.

One skilled in the art could readily see that other methods could be utilized to determine the location of a wireless terminal. For example, the wireless terminals could transmit identification information defining the wireless terminal to a fixed unit which then could relay this information to wireless switching system 101 via wired or wireless media to wireless switching system 101. In addition, global positioning satellite (GPS) devices or base stations could be used to determine a position of a wireless terminal.

In accordance with the invention, it is possible to establish a call pickup group based on the location of the wireless terminals. To understand this operation, consider the following example. A call pickup group is established for cubicle areas 113 and 114 but not for cubicle area 112. In addition, as will be explained later in greater detail, it is possible for a wireless terminal to be marked in Table 1 indicating that when the wireless terminal enters a cubicle area having a call pickup group that the marked wireless terminal will not become part of this group. Table 1 illustrates that cubicle areas 113 and 114 have been set up as having call pickup groups by location as indicated in column 202. Cubicle area 112 does not have a call pickup group established for it. Table 1 allows a wireless terminal to be marked as excluded from the call pickup groups of certain cubicle areas as indicated in column 203. If a "0" is entered in column 203, the wireless terminal is excluded from all areas. In the present example, wireless terminal 101 will not become part of the call pickup group for cubicle area 113 when wireless terminal 101 enters cubicle area 113 and receives transmission from fixed unit 115. Similarly, wireless terminal 103 is excluded from the call pickup groups for both cubicle area 113 and 114.

In operation, if a call is directed to wireless terminal 104 in cubicle area 113, wireless switching system 101 searches Table 1 and determines that wireless terminals 105 and 106 are part of the call pickup group. Consequently, wireless switching system 101 transmits alerting (ringing) to wireless terminals 104, but wireless terminals 105 and 106 can is pick the call up. The first of these wireless terminals to answer in response to the alerting signal will have the incoming call switched to it by wireless switching system 101. If a call is directed to wireless terminal 102 in cubicle area 112, only wireless terminal 102 is alerted, and wireless terminal 103 can not pick the call up since Table 1 of FIG. 2 in column 202 designates no call pickup group for cubicle area 112.

Consider now when wireless terminals 102 and 103 leave cubicle area 112 and enter cubicle area 113. Table 1 is updated as illustrated in FIG. 3. Column 204 of Table 1 of FIG. 3 illustrates that wireless terminals 102 and 103 are now in communication with fixed unit 115. When wireless terminal 102 entered cubicle area 113, it became part of the call pickup group for cubicle area 113 as illustrated in column 202 of FIG. 3 since wireless terminal 102 is not marked as being excluded from being part of the call pickup group for cubicle area 113. However, wireless terminal 103 did not become part of the call pickup group for cubicle area 113 since wireless terminal 103 is excluded from being part of a call pickup group in cubicle area 113 as marked in column 203 of FIG. 3. If a call comes in once again for wireless terminal 104, wireless switching system 101 searches column 202 and determines that wireless terminals 102, and 104–106 are part of a call pickup group for cubicle area 113 of which wireless terminal 106 is located. Based on this determination, wireless switching system 101 alerts wireless terminal 104, and wireless terminals 102, 105 and 106 can pick the call up.

Figures 11, 12:
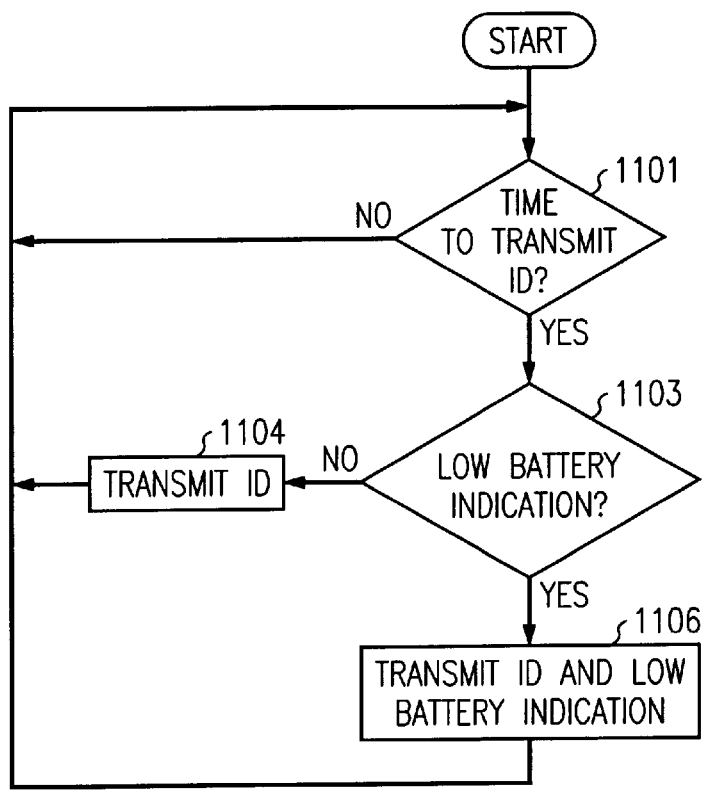
FIG. 11 illustrates, in flow chart form, steps performed by a fixed unit.
FIG. 12 illustrates Table 2 that is maintained by a wireless switching system.

As illustrated in FIG. 12, each cubicle area is assigned a unique telephone number. When an incoming call is received, wireless switching system 101 examines Table 2 of FIG. 12. If an entry is found for the called telephone number, wireless switching system 101 then examines Table 1 of FIGS. 2–4 to determine which wireless terminals are part of a call pickup group for that cubicle area. For example, if an incoming call is received for telephone number 538-2903, wireless switching system 101 examines Table 2 and determines that this is the area telephone number for cubicle area 113. Wireless switching system 101 then examines to Table 1. Examining Table 1 of FIG. 2, wireless switching system 101 would find that wireless terminals 104–106 are the call pickup group for location 113. Wireless switching system 101 then alerts wireless terminal 104 since it is the first wireless terminal in column 201 associated with location 114. Wireless terminals 105 and 106 can answer the call. One skilled in the art could readily envision other algorithms could be used to select the wireless terminal to be alerted out of the call pickup group.

FIG. 4 reflects the changes to Table 1 when wireless terminal 103 moves back into cubicle area 112, and wireless terminal 107 moves into cubicle area 113. The call pickup group for cubicle area 113 comprises wireless terminals 102 and 104–107. The call pickup group for cubicle area 114 is made up of only wireless terminals 108 and 109.

Figure 5:
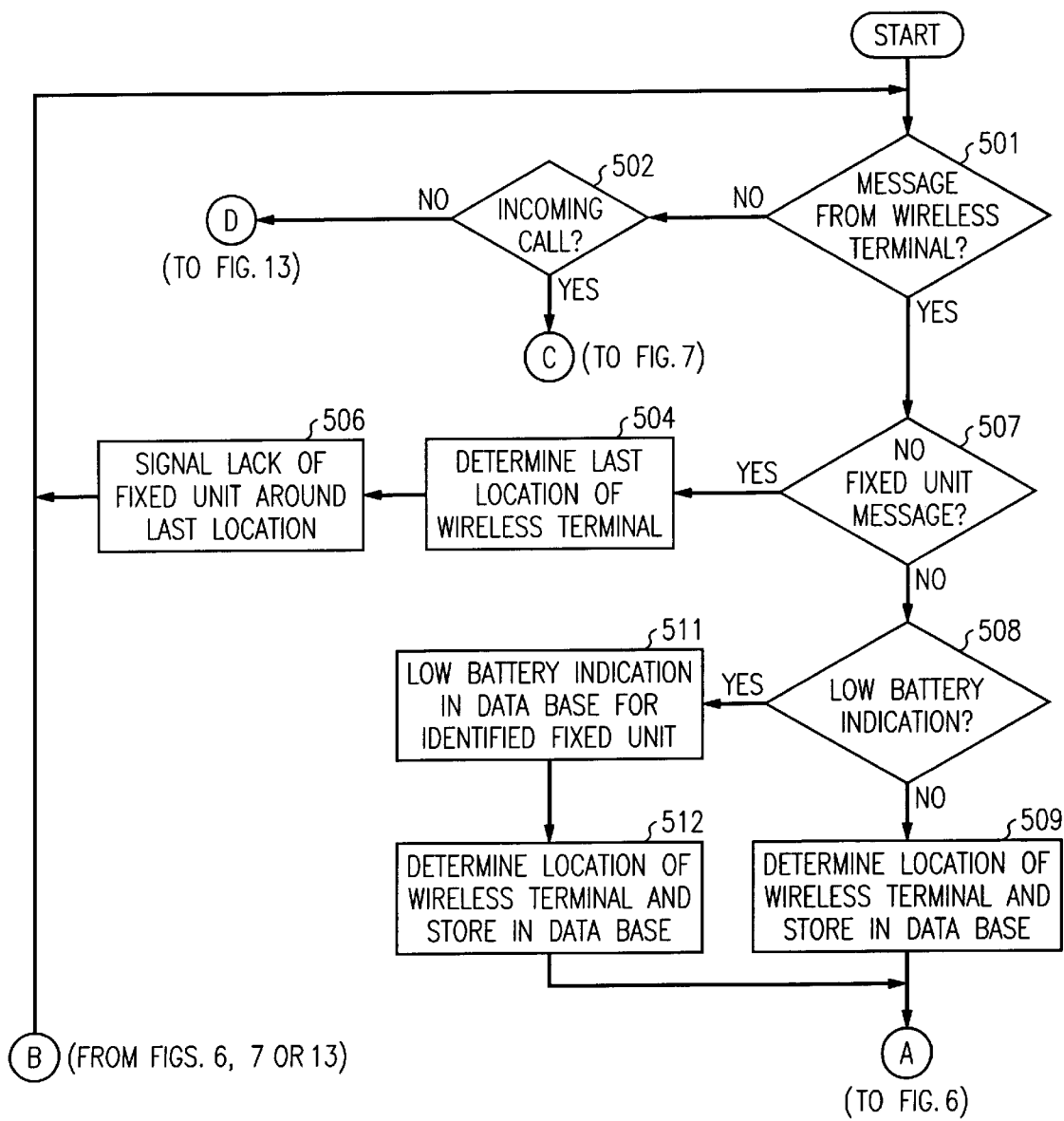
FIGS. 5, 6, 7 and 13 illustrate, in flow chart form, steps performed by a wireless switching system.
Figure 6:
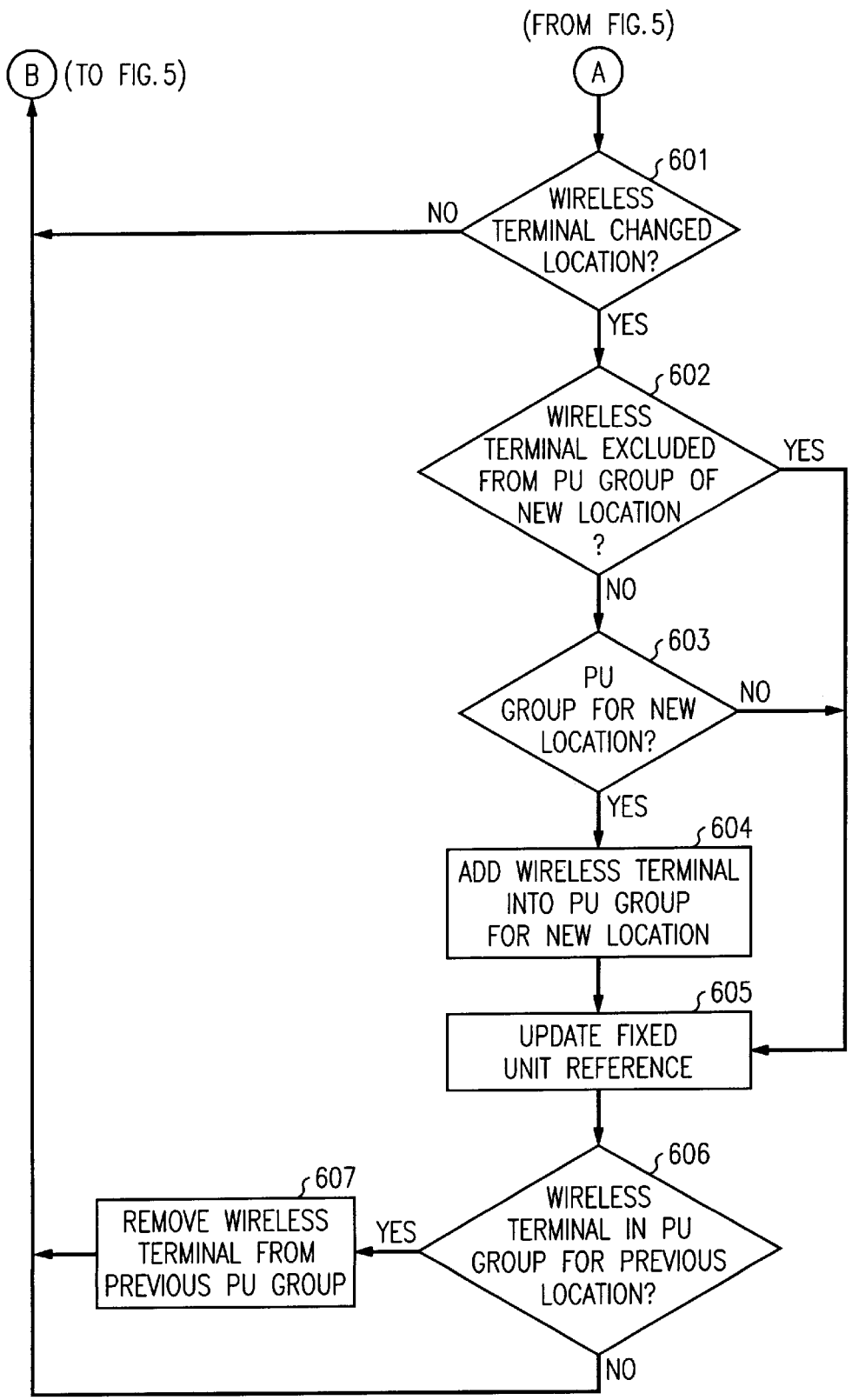
Figure 7:
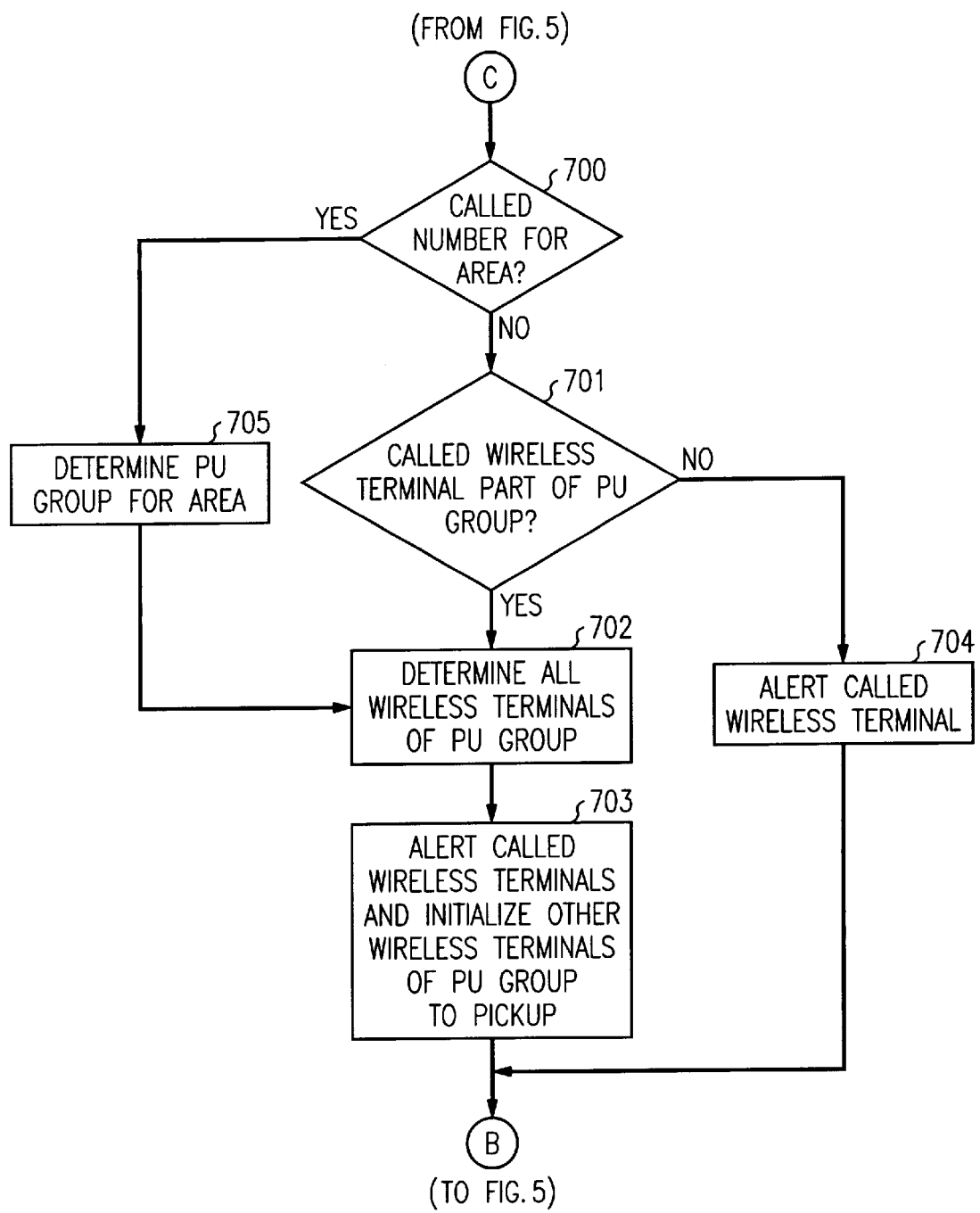

FIGS. 5, 6 and 7 illustrate, in flow chart form, the steps performed by wireless switching system 101 in implementing the invention. Decision block 501 determines if a message has been received from a wireless terminal. If the answer is no in decision block 501, control is transferred to decision block 502 which determines if an incoming call is being received for one of the wireless terminals. If the answer is no, control is transferred to decision block 1301 of FIG. 13. If the answer in decision block 502 is yes, control is transferred to decision block 701 of FIG. 7.

If the answer in decision block 501 is yes, decision block 507 determines if a "no fixed unit" message is being received from a wireless telephone. Such a message indicates that a wireless telephone is not receiving the transmission signal from any fixed unit. If the answer is yes in decision block 507, control is transferred to block 504 which determines the last known location. Wireless switching system 101 maintains a list of last known locations for each of the wireless terminals. Block 506 then signals that the wireless telephone cannot receive a fixed unit around the last location listed for the wireless telephone. This signaling may be in the form of a message displayed to an operator of wireless switching system 101 or merely a message being included in a maintenance log of wireless switching system 101. After execution of block 506, control is transferred back to decision block 501.

Returning to decision block 507, if the answer is no, decision block 508 determines if a low battery indication was included in the message identifying the fixed unit from the wireless telephone. If the answer is no in decision block 508, block 509 determines the location based on the identification code of the fixed unit of the wireless telephone before transferring control to decision block 601 of FIG. 6. If the answer in decision block 508 is yes, the low battery indication for the identified fixed unit is placed in the database by block 511, and a maintenance message indicating low battery is generated before transferring control to block 512. Block 512 performs the same operations as block 509 before transferring control to decision block 601 of FIG. 6.

After the determination of the location of a wireless terminal has been made in either block 509 or 512, control is transferred to decision block 601 of FIG. 6. The latter decision block determines if the location of the wireless terminal has changed by examining column 204 of Table 1. If the answer is no, control is transferred back to decision block 501 of FIG. 5. If the answer in decision block 601 is yes, control is transferred to decision block 602 which determines if the wireless terminal is excluded from entering a call pickup group of the new location by examining column 203 of Table 1 of FIGS. 2–4. If the answer is yes in decision block 602, control is transferred to block 605 whose operations will be described later. If the answer in decision block 602 is no, decision block 603 determines if there is a call pickup group for the new location. If the answer is no, control is transferred to block 605. If the answer is yes in decision block 603 that there is a call pickup group for the new location, block 604 adds the wireless terminal into the call pickup group for the new location by updating column 202 of Table 1 of FIGS. 2–4 before transferring control to block 605. The latter block updates column 204 of table 1 to reflect the fixed unit from which the wireless terminal is now receiving identification information. Then, decision block 606 determines if the wireless terminal was in a call pickup group for the previous location by examining column 202 of Table 1 of FIGS. 2–4. If the answer is no, control is transferred back to decision block 501 of FIG. 5. If the answer is yes in decision block 606, block 607 removes the wireless terminal from the previous call pickup group by administering column 202 of Table 1 of FIGS. 2–4 before transferring control back to decision block 501 of FIG. 5.

Returning to decision block 502, if the answer is yes, control is transferred to decision block 700 of FIG. 7. The latter block determines if the called number is for an cubicle area by examining Table 12. If the answer is yes in decision block 700, control is transferred to block 705 which determines the call pickup group for the cubicle area by examining Table 1 of FIGS. 1–4 before transferring control to block 702. If the answer in decision block 700 is no, control is transferred to decision block 701. The latter decision block determines if the called wireless terminal is part of a call pickup group by examining columns 201 and 202 of Table 1 of FIGS. 2–4. If the answer is yes, all of the wireless terminals that are part of the call pickup group are determined by block 702, and block 703 alerts the called wireless terminal and initializes for allowing the other wireless terminals that are part of the call pickup group to pickup the call before transferring control back to decision block 501 of FIG. 5. If the answer in decision block 701 is no, block 704 only alerts the called wireless terminal before transferring control back to decision block 501 of FIG. 5.

Figure 13:
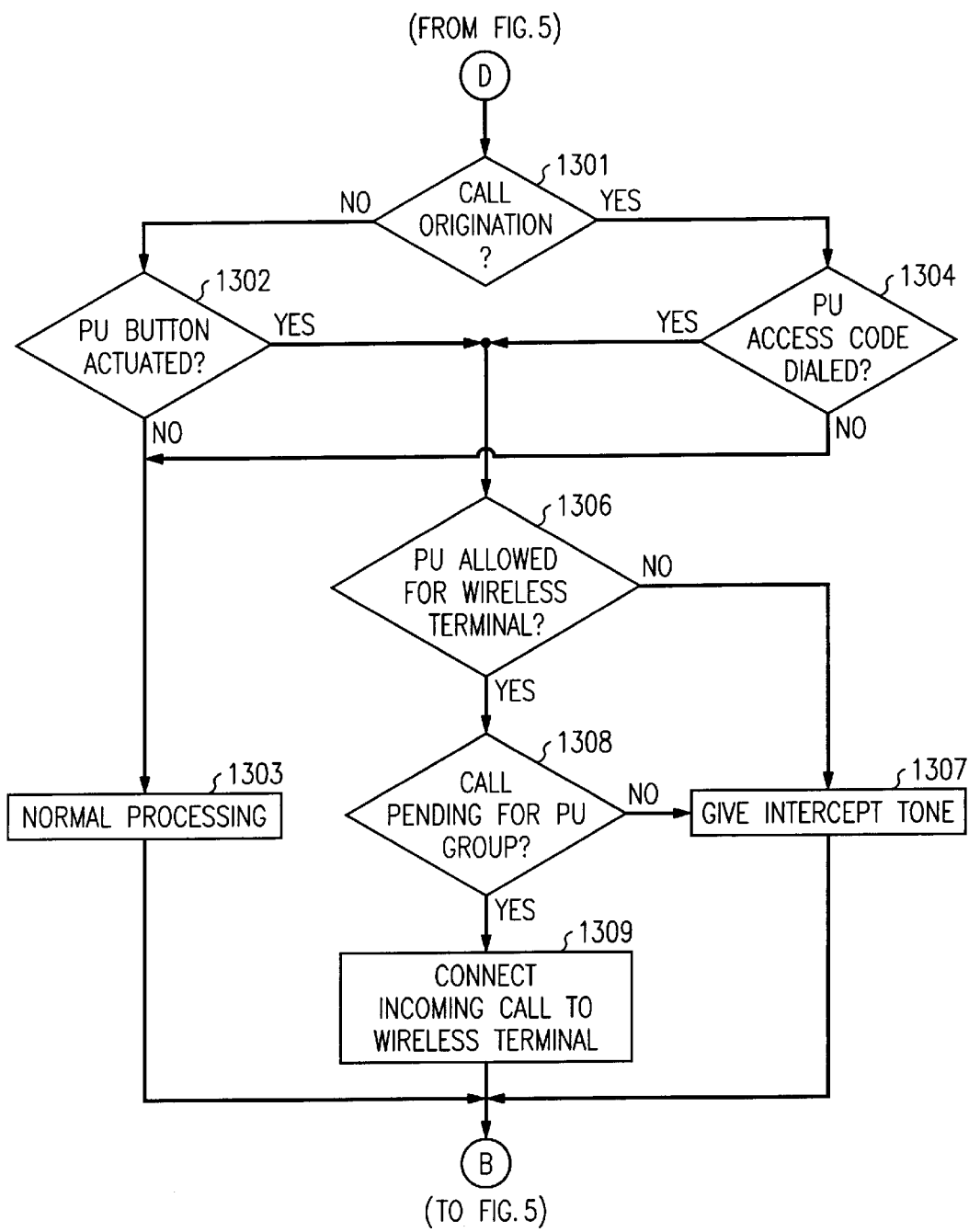

Returning again to decision block 502 of FIG. 5, if the answer is no, control is transferred to decision block 1301 of FIG. 13. The latter block determines if a call origination has occurred in a wireless terminal. If the answer is no, control is transferred to decision block 1302 to determine if a pickup button has been actuated on a wireless terminal. The actuation of a pickup button indicates that the wireless terminal wishes to pickup a ringing call. If the answer is no in decision block 1302, control is transferred to block 1303 for normal processing before control is returned back to decision block 501 of FIG. 5. If the answer in decision block 1302 is yes indicating that a pickup button has been actuated, control is transferred to decision block 1306. Returning to decision block 1301, if a call origination has occurred, decision block 1304 determines if the wireless terminal is dialing a pickup access code. If the answer is no, control is transferred to block 1303 whose operations were previously described. If a pickup access code is being dialed, control is transferred to decision block 1306 that determines if pickup is allowed for this wireless terminal. If the answer is no, the wireless terminal receives intercept tone by execution of block 1307 before control is returned back to decision block 501 of FIG. 5. If the answer in decision block 1306 is yes, decision block 1308 determines if there is a call pending for the pickup group of which the wireless terminal is part. If the answer is no, control is transferred to block 1307 whose operations were previously described. If the answer in decision block 1308 is yes, block 1309 connects the incoming call to the wireless terminal before transferring control back to decision block 501 of FIG. 5.

Figure 8:
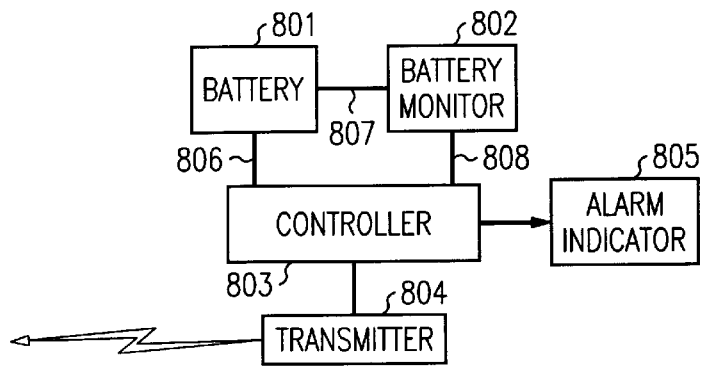
FIG. 8 illustrates, in block diagram form, a fixed unit.

FIG. 8 illustrates in block diagram form a fixed unit. The fixed unit of FIG. 8 is powered by battery 801. However, one skilled in the art could readily see that normal building AC power could also be utilized to power the fixed unit. Controller 803 periodically transmits the identification code for the fixed unit via transmitter 804. Advantageously, transmitter 804 can be transmitting utilizing infrared transmission or ultrasonic transmission. Transmitters for transmitting either infrared or ultrasonic are well known in the art. If controller 803 detects that battery 801 is at a low power level via conductor 807, battery monitor 802, and conductor 808, controller 803 sets alarm indicator 805 and transmits the low power indication along with the identification code via transmitter 804.

Figure 9:
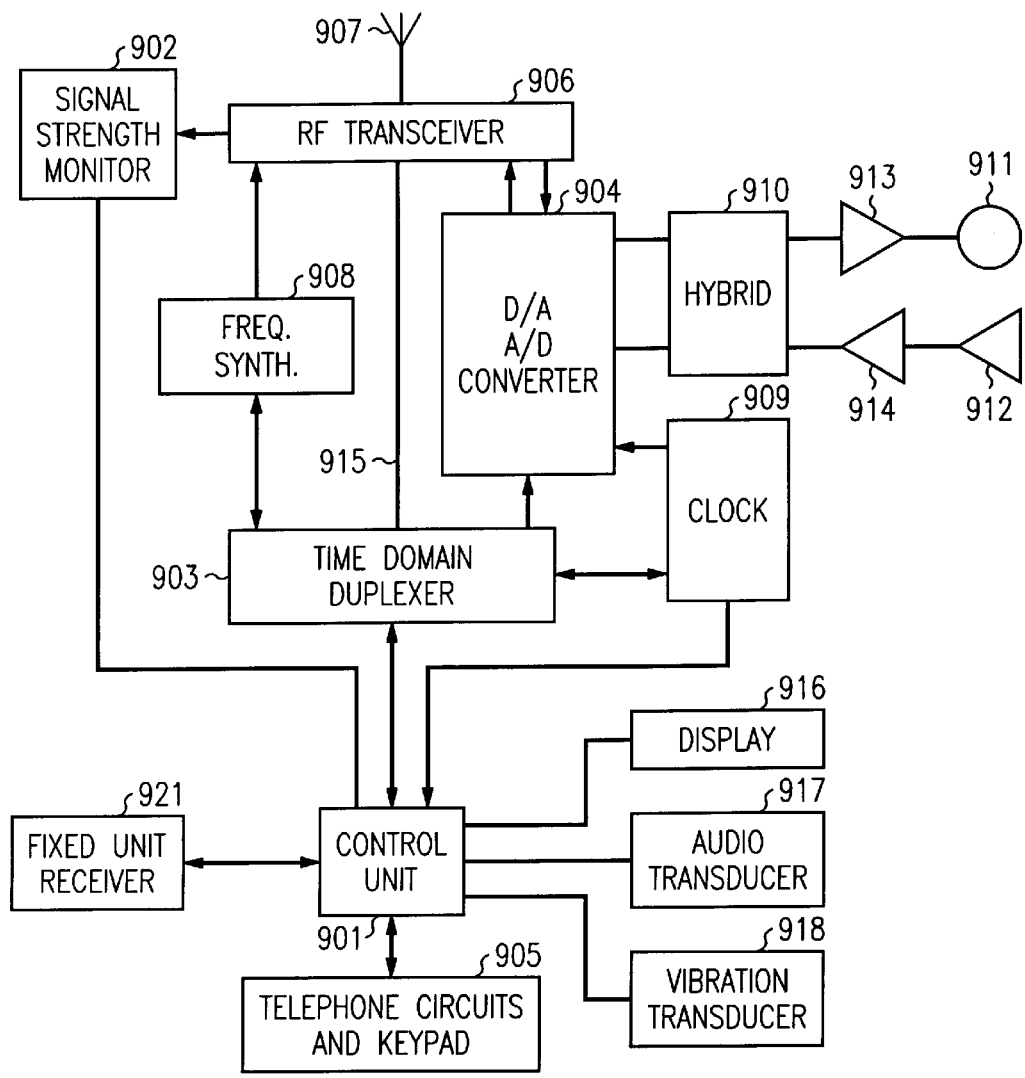
FIG. 9 illustrates, in block diagram form, a wireless terminal.

Wireless handset 112 is illustrated in greater detail in FIG. 9. Wireless handset 112 implements a wireless protocol that allows wireless handset 112 to maintain a wireless signal link with wireless switching system 101 via base stations 121–122. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 901. Units 902, 903, 906, 907, 908, and 909 provide the RF communication capabilities for the wireless handset. Elements 904, 910, and 911–914 provide the audio information received and transmitted to the user; whereas, elements 916–918 and 905 provide the basic user interface. The PHS protocol allows control unit 901 to establish a logical data channel with wireless switching system 101. Control unit 901 utilizes this logical data channel to transmit identification information for fixed units to wireless switching system 101. Fixed unit receiver 921 receives the identification code of a fixed unit and transfers this identification code to control unit 901 for transmission to wireless switching system 101. Fixed unit receiver 921 is of a design well known in the art for either infrared or ultrasonic transmission media. One skilled in the art could readily see that fixed unit receiver 921 could provide to control unit 901 the signal strength of the received signal. Further, control unit 901 could also tune fixed unit receiver 921 to receive different frequencies or other variations of the transmission media using well known techniques in the art.

Figure 10:
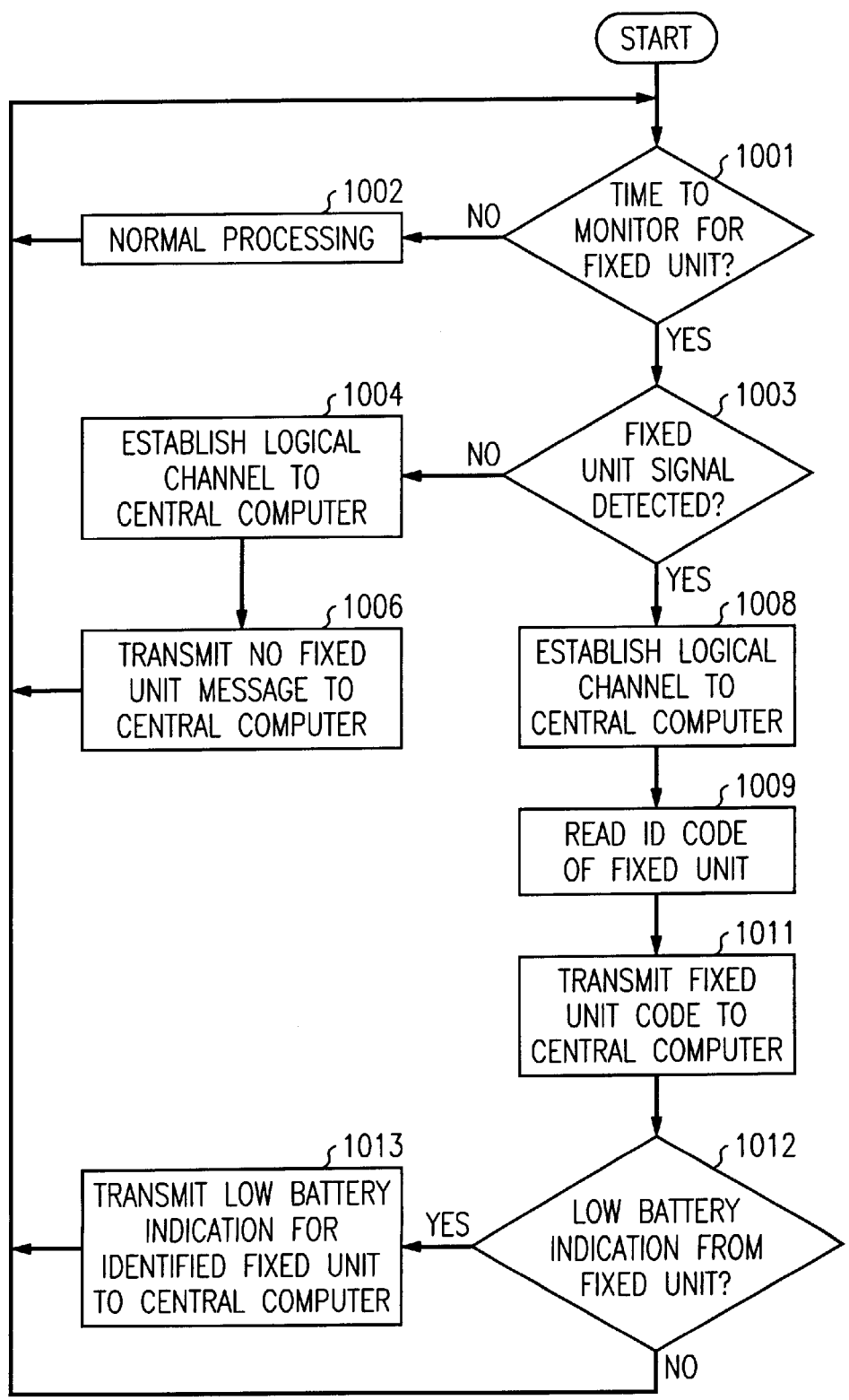
FIG. 10 illustrates, in flow chart form, steps performed by a wireless terminal.

FIG. 10 illustrates the steps performed by a wireless terminal such as wireless handset 113. Decision block 1001 determines if the time has elapsed to monitor for a fixed unit. Advantageously, every second the wireless handset monitors to determine if the transmission signal of a fixed unit is being received. If the answer in decision block 1001 is no, normal processing is performed by block 1002 before control is returned back to decision block 1001.

If the answer in decision block 1001 is yes, control is transferred to decision block 1003 which determines if a transmission signal is being detected. If the answer in decision block 1003 is no, control is transferred to block 1004 which establishes a logical channel to wireless switching system 101 via a base station. After the establishment of the logical channel, the wireless handset transmits a "no fixed unit" message to the central computer in block 1006 before transferring control back to decision block 1001. Returning to decision block 1003, if the answer is yes, control is transferred to block 1008 which establishes a logical channel to wireless switching system 101. Block 1009 determines the identification code of the fixed unit whose transmission signal is being received, and block 1011 transmits the received identification code to wireless switching system 101 before transferring control to decision block 1012. Decision block 1012 determines if a low battery indication was included in the transmission signal from the fixed unit. If the answer is no, control is transferred back to decision block 1001. If the answer in decision block 1012 is yes, block 1013 transmits a low battery indication message to wireless switching system 101 for the identified fixed unit and also returns control to 1001. FIG. 11 illustrates the steps performed by a fixed unit. Decision block 1101 determines if it is time to transmit the identification code of the fixed unit. Advantageously, the identification code is transmitted every tenth of a second. If the answer is no, control is transferred back to decision block 1101. If the answer is yes, decision block 1103 determines if battery monitor 802 of FIG. 8 is indicating a low battery. If the answer is no, block 1104 simply transmits the identification code of the fixed unit before transferring control back to decision block 1101. If the answer in decision block 1103 is yes, block 1106 transmits a message that includes the identification code and a low battery indication before transferring control back to decision block 1101.

Of course, various changes in modification to the illustrated embodiment described above will be apparent to those skilled in the art. These changes and modifications can be made without departing from the spirit and scope of the invention and without diminishing its intended advantages.

It is therefore intended that such changes and modifications be covered by the following claims.

What is claimed is:

1. A method of establishing a call pickup group, comprising the steps of:
   determining ones of a plurality of wireless terminals that are in a physical location which is limited to an interior room of a building;
   inserting the determined ones of the plurality of wireless terminals into the call pickup group;
   directing an incoming call to a first one of the determined ones of the plurality of wireless terminals;
   alerting only the first one of the determined ones of the plurality of wireless terminals in the call pickup group; and
   answering the incoming call by another one of the determined ones of the plurality of wireless terminals in the call pickup group in response to actuation of a call pickup button on the other one of the determined ones of the plurality of wireless terminals.

2. The method of claim 1 further comprises the step of removing one of the determined ones of the plurality of wireless terminals from the call pickup group upon the one of the determined ones of plurality of wireless terminals leaving the physical location.

3. The method of claim 2 wherein the step of inserting comprises the step of excluding designated ones of the determined ones of the plurality of wireless terminals from terminating ring group.

4. The method of claim 3 wherein the step of excluding comprises the step of examining a table defining the wireless terminals to excluded from the terminating ring group.

5. The method of claim 2 further comprises the steps of assigning a telecommunication dial number to the physical location;
   alerting only a third one of the determined ones of the plurality of wireless terminals in the call pickup group; and
   answering the incoming call by another individual one of the determined ones of the plurality of wireless terminals in the call pickup group in response to actuation of a call pickup button on the other individual one of the determined ones of the plurality of wireless terminals.

6. The method of claim 5 wherein the step of alerting the third one of the determined ones of the plurality of wireless terminals in the call pickup group based on the position of the third one of the determined ones of the plurality of wireless terminals in the call pickup group.

7. The method of claim 6 wherein the third one of the determined ones of the plurality of wireless terminals is first in the call pickup group.

8. The method of claim 6 wherein the third one of the determined ones of the plurality of wireless terminals is last in the call pickup group.

9. The method of claim 5 wherein the step of assigning comprises the step of alerting a third one of the determined ones of the plurality of wireless terminals in the call pickup group whereby the third one of the determined ones of the plurality of wireless terminals is selected on the attributes of a assigned user.

10. The method of claim 2 wherein the step of determining the physical location comprises the steps of detecting physical location information by each of the determined ones of the plurality of wireless terminals from a fixed unit; and
    transmitting by each of the determined ones of the plurality of wireless terminals the detected physical location information to a wireless switching system controlling the plurality of wireless terminals.

11. The method of claim 10 wherein the step of determining the physical location comprises the step of identifying the call pickup group from the transmitted detected physical location information.

* * * * *